United States Patent
Keohane et al.

(10) Patent No.: US 7,975,238 B2
(45) Date of Patent: Jul. 5, 2011

(54) IDENTIFYING PREVIOUSLY BOOKMARKED HYPERLINKS IN A RECEIVED WEB PAGE IN A WORLD WIDE WEB NETWORK BROWSER SYSTEM FOR SEARCHING

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2741 days.

(21) Appl. No.: 10/392,762

(22) Filed: Mar. 19, 2003

(65) Prior Publication Data
US 2004/0187074 A1 Sep. 23, 2004

(51) Int. Cl.
*G06F 3/00* (2006.01)
(52) U.S. Cl. ......... 715/812; 715/821; 715/789; 715/745
(58) Field of Classification Search .................. 715/812, 715/821, 789, 745
See application file for complete search history.

(56) References Cited

U.S. PATENT DOCUMENTS
2004/0205501 A1 * 10/2004 Gupta ........................ 715/501.1
* cited by examiner

*Primary Examiner* — Ryan F Pitaro
(74) *Attorney, Agent, or Firm* — J. B. Kraft; Mark E. McBurney

(57) ABSTRACT

Presenting to a user at a receiving Web station, who is viewing a received Web document or Web page, a very clear picture of which hyperlinks in each Web page are linked to a Web page/document that has already been bookmarked by the user. A system for tracking bookmarking in received Web documents that comprises the combination of apparatus associated with one of the receiving display stations for bookmarking of selected received Web documents to thereby store, as bookmarks, at the receiving display station, direct links to the sources of the Web documents, apparatus associated with this one receiving display station for comparing the stored bookmarks to hyperlinks in each received Web document to determine if the hyperlinks have been bookmarked, and an implementation which, in response to the apparatus for comparing, then visually distinguishes each bookmarked hyperlink in the received displayed Web document. A convenient way to visually distinguish such previously bookmarked hyperlinks is to display a small indicator such as a book image next to the hyperlink.

31 Claims, 5 Drawing Sheets

IDENTIFYING PREVIOUSLY BOOKMARKED HYPERLINKS IN A RECEIVED WEB PAGE IN A WORLD WIDE WEB NETWORK BROWSER SYSTEM FOR SEARCHING

TECHNICAL FIELD

The present invention relates to computer managed communication networks such as the World Wide Web (Web) and, particularly, to ease of use of interactive computer controlled display interfaces to receive hypertext documents with hyperlinks that interactively link users from such documents to other documents and programs.

BACKGROUND OF RELATED ART

The 1990's decade has been marked by a technological revolution driven by the convergence of the data processing industry with the consumer electronics industry. The effect has, in turn, driven technologies that have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct links between pages and other documentation on the Web and a variety of related data sources that were at first text and then evolved into media, i.e. "hypermedia". This even further exploded the use of the Internet or Web. It was now possible for the Web browser or wanderer to spend literally hours going through document after document in often less than productive excursions through the Web. These excursions often strained the users' time and resources. It has been generally agreed that in order for the Web or Internet to continue its great expansion, it will be necessary for the Web to greatly reduce its drain on time and related resources. A significant source of this drain is in the Web page (the basic document page of the Web) itself.

In the case of Web pages, we do not have the situation of a relatively small group of professional designers working out the human factors. Rather, in the era of the Web, anyone and everyone can design a Web page. Pages are frequently designed by developers without usability skills. As a result, Web pages are frequently set up and designed in an eclectic manner. Often Web pages are set up through loose business, professional, social and educational configurations with general trade or public input of Web pages. The names or identifiers selected for the hyperlinks by Web page hosts or authors are often very similar to each other. As a result, the user going through one or a series of Web searches or browses will find it virtually impossible to recognize the more important hyperlinks to significant Web documents and pages. Thus, the user may spend considerable time going around in circles. The providers of Web searches have addressed this problem by providing users with the capability of bookmarking of Web documents/pages that may be of particular future interest to the user. Web browsers, which have been available for over a decade as a Web document search and access tools, have provided users with this capability of bookmarking and thereby saving Web documents. Bookmarking stores at a receiving display station direct links to the bookmarked documents and pages for future access so that the user may avoid cumbersome locating and addressing of the Web documents.

While bookmarks have been a significant means of time savings on the Web, the use and need for bookmarks among heavy users of the Web has expanded to the point that such users are encountering difficulty in keeping track of the Web documents or page that they have bookmarked. The confusing similarities between names of hyperlinks mentioned above together with the great increase in numbers of user bookmarked documents has made it exceedingly difficult for the user to recognize which hyperlinks in a displayed received Web page or document is a link to an already bookmarked document. This confronts the user with the frequent tedious task of sorting through his existing bookmarks. Worse yet, the user may end up with multiple bookmarks to the same Web documents, which even further compounds the problem.

SUMMARY OF THE PRESENT INVENTION

The present invention provides a system, method and program to present to a user at a receiving Web station, who is viewing a received Web document or Web page, a very clear picture of which hyperlinks in each Web page are linked to a Web page/document that has already been bookmarked by the user.

In a Web communication network with user access via a plurality of data processor controlled interactive receiving display stations for displaying received hypertext documents, transmitted from sources on the Web, including at least one display page containing text, images and a plurality of embedded hyperlinks, each hyperlink being user selectable to access and display a respective linked hypertext document, this invention provides a system for tracking bookmarking in received Web documents that comprises the combination of apparatus associated with one of the receiving display stations for bookmarking of selected received Web documents to thereby store, as bookmarks, at the receiving display station, direct links to the sources of the Web documents, apparatus associated with this one receiving display station for comparing the stored bookmarks to hyperlinks in each received Web document to determine if said hyperlinks have been bookmarked, and an implementation, which in response to the apparatus for comparing, then visually distinguishes each bookmarked hyperlink in the received displayed Web document.

A convenient way to visually distinguish such previously bookmarked hyperlinks is to display a small indicator, such as a book image, next to the hyperlink. Alternatively, the hyperlink may be highlighted to indicate the previous bookmarking.

The above-described bookmarking and tracking functions may be implemented through a Web/Internet (the terms are used interchangeably) browser. Such a Web browser would include the above-mentioned combination of means for bookmarking of selected received Web documents, means for comparing said stored bookmarks to hyperlinks in each received Web document to determine if the hyperlinks have been bookmarked and means for visually distinguishing each bookmarked hyperlink in the received displayed Web document.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
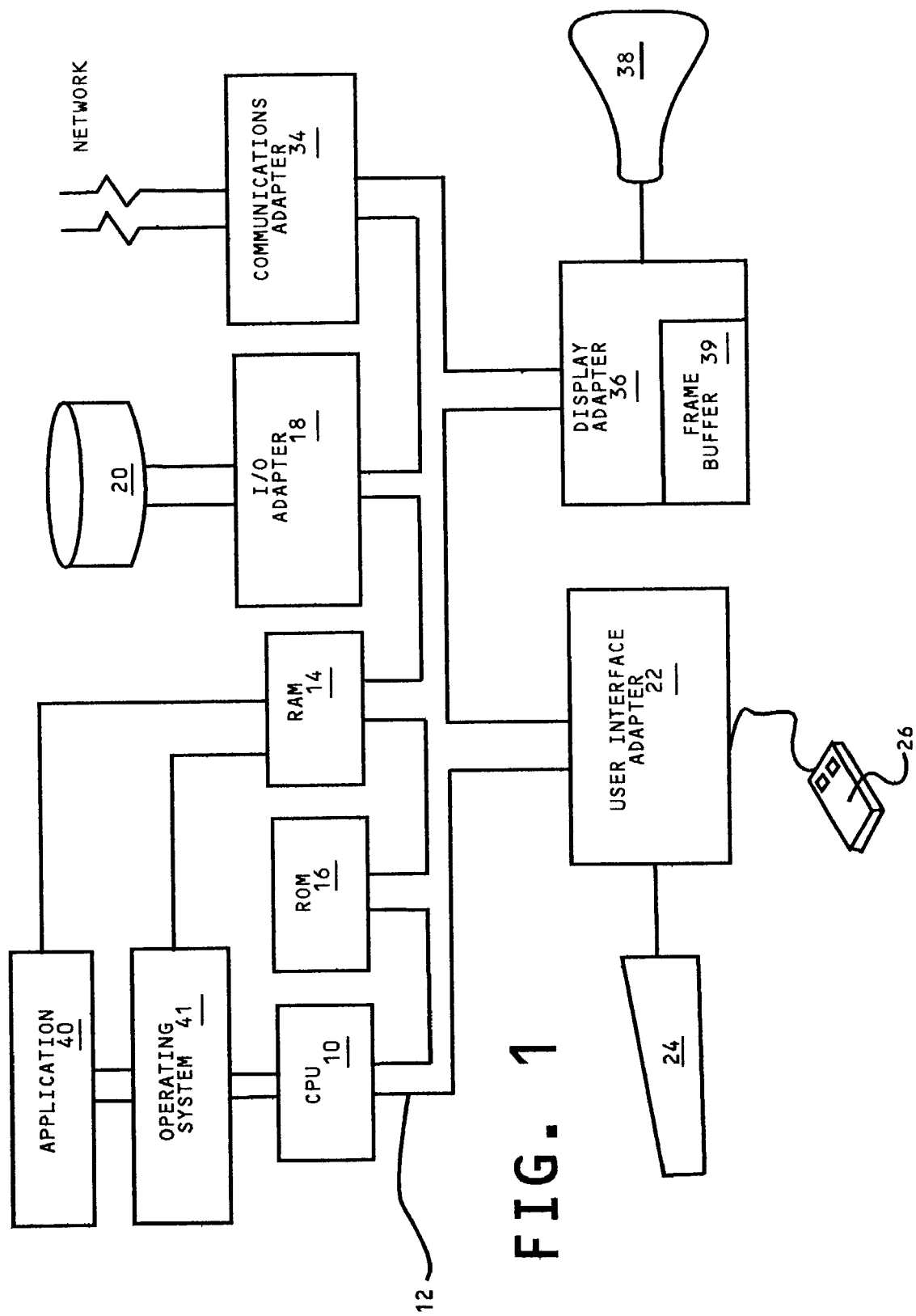
FIG. 1 is a block diagram of a data processing system including a central processing unit and network connections via a communications adapter that is capable of implementing the receiving display station on which the received Web page or Web document may be processed in accordance with the present invention.

Referring to FIG. 1, a typical data processing terminal is shown that may function as a basic computer controlled network receiving terminal used in implementing the present invention for indicating which hyperlinks in a displayed Web document are linked to previously bookmarked Web documents. A central processing unit (CPU) 10, such as one of the PC microprocessors or workstations, e.g. RISC System/6000™ series available from International Business Machines Corporation (IBM), or Dell PC microprocessors, is provided and interconnected to various other components by system bus 12. An operating system 41 runs on CPU 10, provides control and is used to coordinate the function of the various components of FIG. 1. Operating system 41 may be one of the commercially available operating systems, such as IBM's AIX 6000™ operating system or Microsoft's WindowsXP™ or Windows2000™, as well as UNIX and other IBM AIX operating systems. Application programs 40, controlled by the system, are moved into and out of the main memory Random Access Memory (RAM) 14. These programs include the program of the present invention that will be described hereinafter in combination with any conventional Web browser at the receiving Web station, such as Netscape 6.0™ or Microsoft's Internet Explorer™. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside Internet or Web network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs for indicating in received displayed documents which hyperlinks are linked to already bookmarked Web documents display terminal according to the present invention. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods that may be related to the present invention. Since a major aspect of the present invention is directed to documents, such as Web pages and the content therein, transmitted over networks, an understanding of networks and their operating principles would be helpful. We will not go into great detail in describing the networks to which the present invention is applicable. Reference has also been made to the applicability of the present invention to a global network, such as the Internet or Web. For details on Internet nodes, objects and links, reference is made to the text, *Mastering the Internet*, G. H. Cady et al., published by Sybex Inc., Alameda, Calif., 1996.

The Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. In this connection, the term "documents" is used to describe data transmitted over the Web or other networks and is intended to include Web pages with displayable text, graphics, other images and audio. This displayable information may be still, in motion or animated, e.g. animated GIF images. Web documents are conventionally implemented in HTML language, which is described in detail in the text entitled *Just Java*, van der Linden, 1997, SunSoft Press, particularly at Chapter 7, pp. 249-268, dealing with the handling of Web pages; and also in the above-referenced *Mastering the Internet*, particularly at pp. 637-642, on HTML in the formation of Web pages. The images on the Web pages are implemented in a variety of image or graphic files such MPEG, JPEG or GIF files, which are described in the text, *Internet: The Complete Reference, Millennium Edition*, Young et al., 1999, Osborne/McGraw-Hill, particularly at pp. 728-730.

In addition, aspects of this invention will involve Web browsers. A general and comprehensive description of browsers may be found in the above-mentioned *Mastering the Internet* text at pp. 291-313. More detailed browser descriptions may be found in the above-mentioned *Internet: The Complete Reference, Millennium Edition* text: Chapter 19, pp. 419-454, on the Netscape Navigator; Chapter 20, pp. 455-494, on the Microsoft Internet Explorer; and Chapter 21, pp. 495-512, covering Lynx, Opera and other browsers.

Browsers call on search engines for searching the various content provider sources on the Web. As described in the above-mentioned *Internet: The Complete Reference, Millenium Edition* text, pp. 395 and 522-535, search engines use keywords and phrases to query the Web for desired subject matter. In carrying out its search, the search engine looks through the database for matches to keywords subject to the engine syntax. The search engine then presents to the user a list of the Web pages it determines to be closest to the requested query. Some significant search engines are: AltaVista, Infoseek, Lycos, Magellan, Webcrawler and Yahoo. Using the browser, the user interactively goes through the search results, selecting Web page by Web page and the hyperlinks therein. The user may conventionally bookmark and, thus, save for future perusal, the Web pages or documents of interest.

Conventional bookmarking involves the saving of the URL (Uniform Resource Locator), i.e. the Web address of the bookmarked Web page or document, thereby saving the user the time and inconvenience of directly entering a lengthy URL. Bookmarks and bookmarking expedients are described in detail in the text, *The Web Navigator*, Paul Gilster, John Wiley and Sons Inc., 1997, pp. 121-131.

Figure 2:
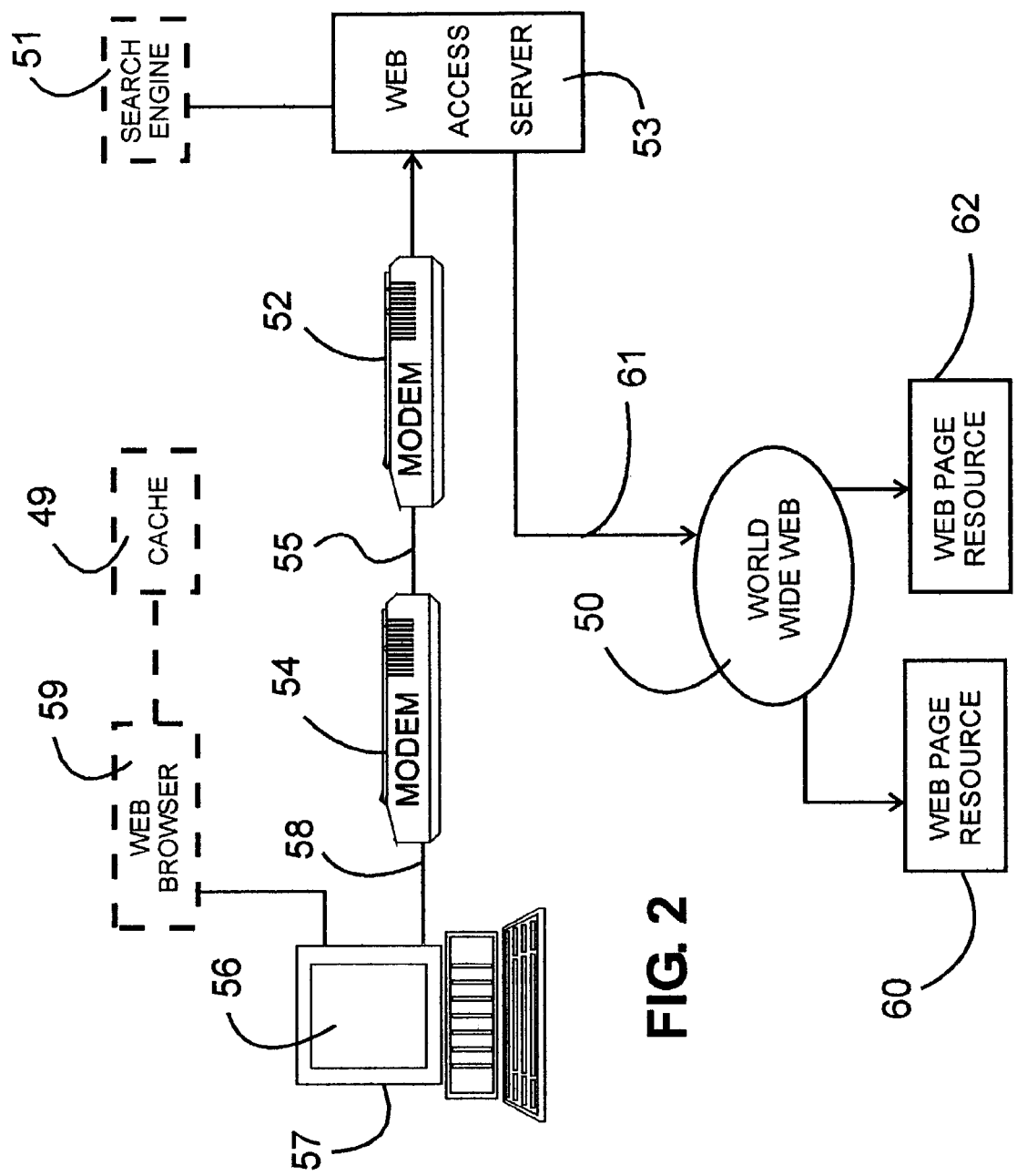
FIG. 2 is a generalized diagrammatic view of a Web portion upon which the present invention may be implemented.

A generalized diagram of a portion of the Web that the computer controlled display terminal 57 used for Web page receiving during searching or browsing, is connected as shown in FIG. 2. Computer display terminal 57 may be implemented by the computer system setup in FIG. 1 and connection 58 (FIG. 2) is the network connection shown in FIG. 1. For purposes of the present embodiment, computer 57 serves as a Web display station and has received displayed Web page 56, which is one of a sequence of Web pages containing embedded hyperlinks to other Web pages or documents.

A generalized diagram of a portion of the Internet, which the computer 57 controlled display terminal used for Web page 56 or other document display of the present invention, is connected as shown in FIG. 2. Display terminal 57 with Web page display is the computer system shown in FIG. 1 and connection 58 (FIG. 2) is the network connection shown in FIG. 1. Reference may be made to the above-mentioned *Mastering the Internet*, pp. 136-147, for typical connections between local display workstations to the Internet via network servers, any of which may be used to implement the system on which this invention is used. The system embodiment of FIG. 2 is one of these known as a host-dial connection. Such host-dial connections have been in use for over 30 years through network access servers 53 that are linked 51 to the Internet 50. The servers 53 are maintained by a service provider to the client's display terminal 57. The host's server 53 is accessed by the client terminal 57 through a normal dial-up telephone linkage 58 via modem 54, telephone line 55 and modem 52. The HTML files representative of the Web pages are downloaded to display terminal 57 through controlling server 53 and computer 56 via the telephone line linkages from server 53 that may have accessed them from the Internet 50 via linkage 61. Web browser 59 controls all of the Web page accessing, display and bookmarking functions being described, including requesting searches via search engine 51 to access Web documents/pages from Web page resources 60 and 62 via Web 50. Cache 49 serves the function of a Web browser in the local display computer system associated with the Web page receiving display. All standard browser programs are capable of local caching. While some form of caching is preferred, the manner of caching is not key to this invention.

Figure 3:
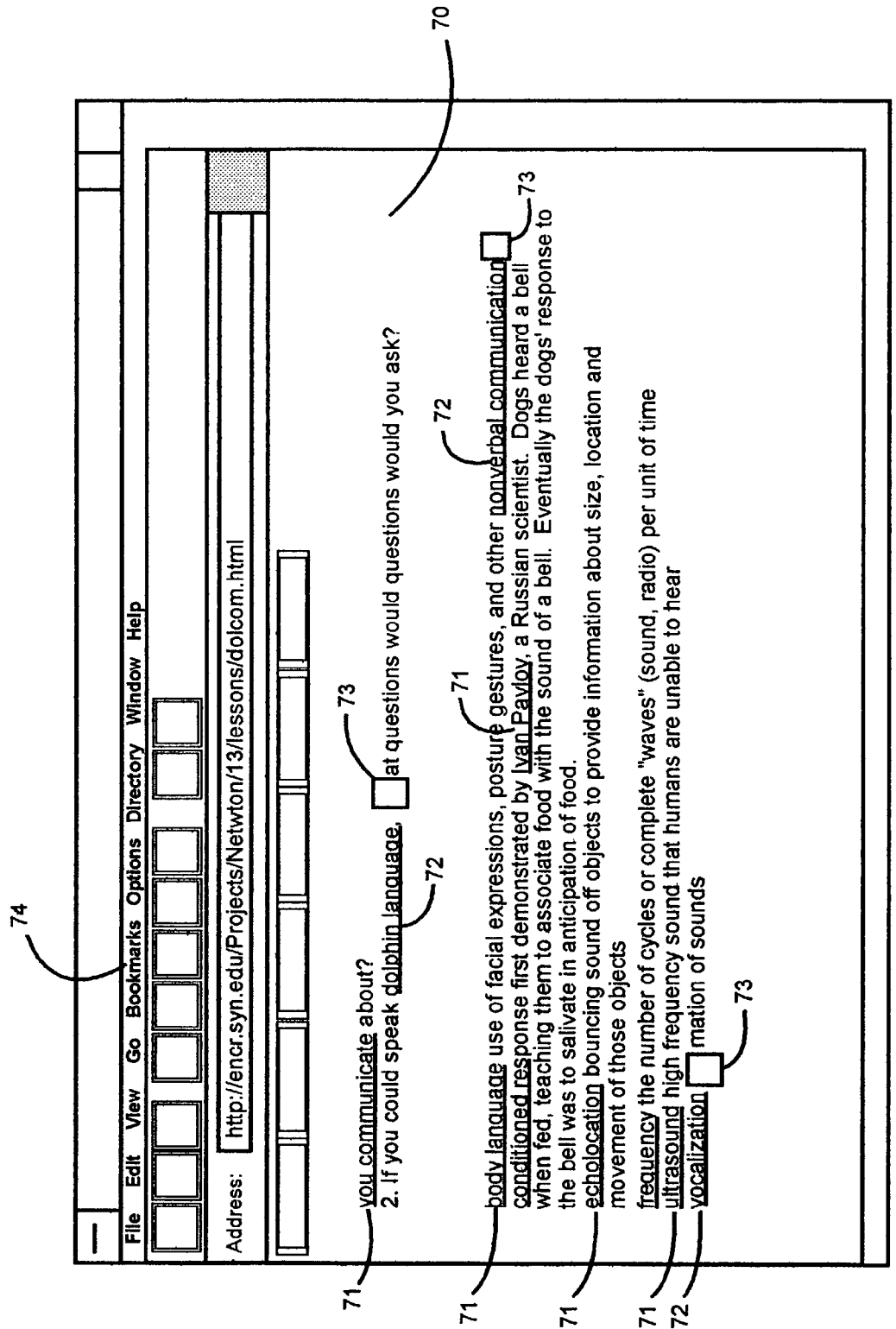
FIG. 3 is a diagrammatic illustration of a display screen showing a Web page with hyperlinks that are unmarked or marked dependent on whether their respective Web pages have been previously bookmarked.

With reference, to FIG. 3, there is shown a typical displayed Web page modified in accordance with the present invention. The Web page 70 is displayed in a window with a bookmark function 74 in the tool bar. Thus, if the user wishes to bookmark page 70, he may commence to do so by clicking function 74 via a mouse pointer in a conventional manner. In any event when a Web page 70 is displayed, its hyperlinks 71, through which other Web documents may be accessed, are shown suitably highlighted, e.g. underlined. In addition, there are several hyperlinks 72 that are linked to documents that have been previously bookmarked. The implementation of the present invention has kept a list of the URLs of all Web documents that have been previously bookmarked. The URLs of the bookmarked documents have been stored in a list; then, as the present Web page has been accessed for display, the URLs of the hyperlinks therein have been compared to the user's URL list of bookmarked documents and those hyperlinks 72 representative of previously bookmarked Web documents have been indicated by an indicator 73 symbol in the form of a book image.

Figure 4:
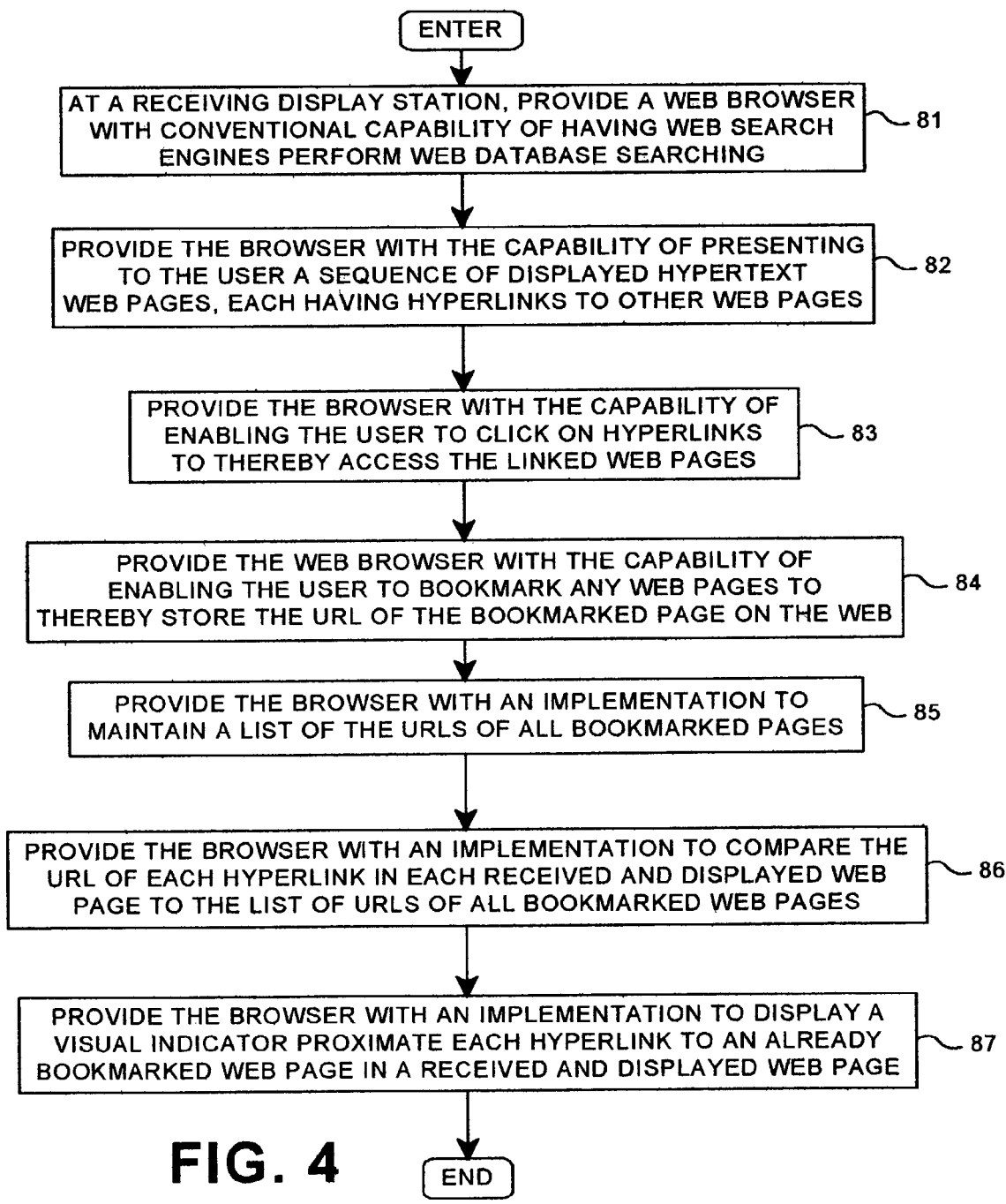
FIG. 4 is a general flowchart of a program set up to implement the present invention for indicating whether hyperlinks in received Web documents are linked to previously bookmarked documents.
Figure 5:
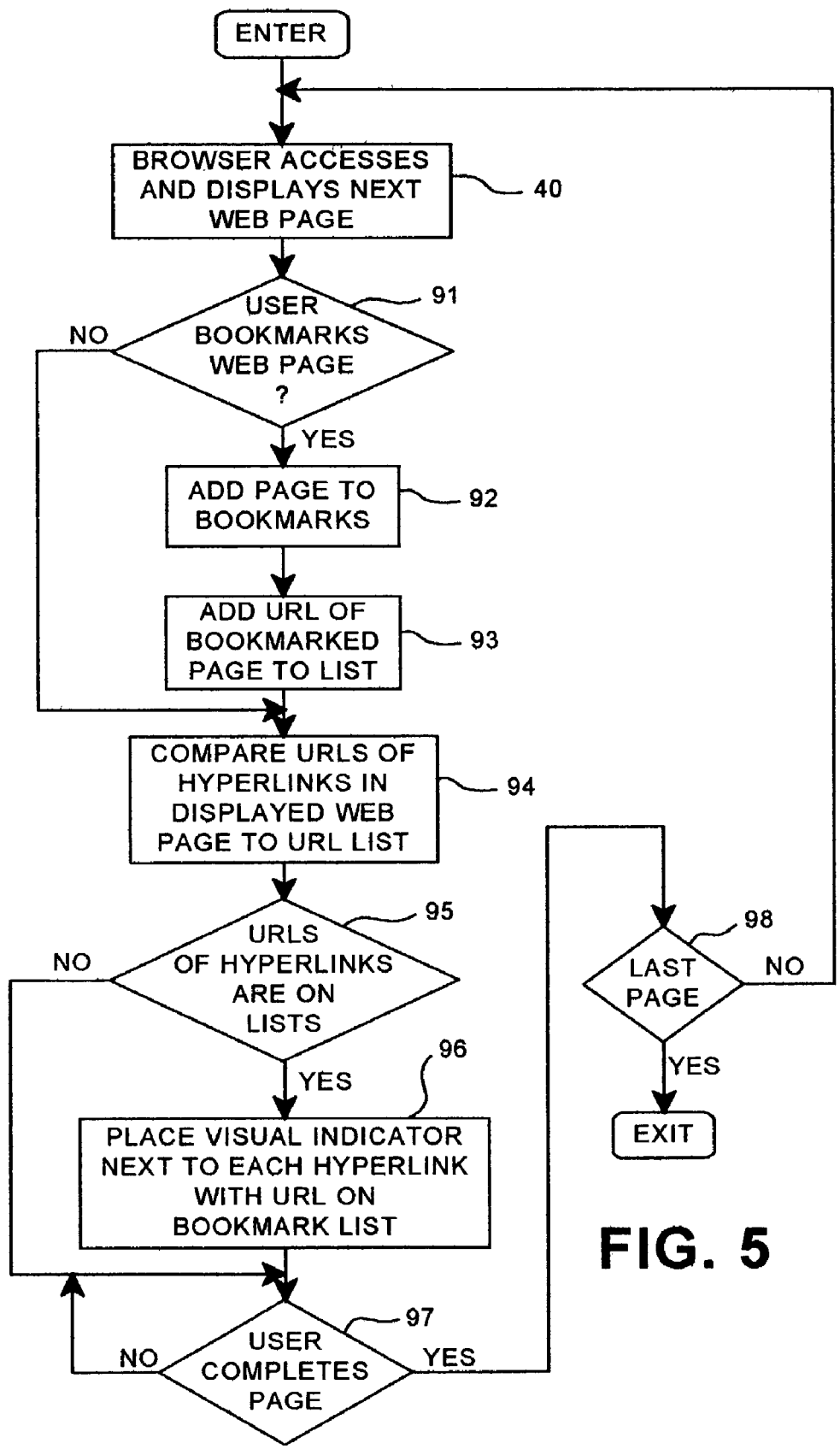
FIG. 5 is a flowchart of an illustrative run of the program set up in FIG. 6.

Now, with reference to FIGS. 4 and 5, we will describe a process implemented by the present invention in conjunction with the flowcharts of these figures. FIG. 4 is a flowchart showing the development of a process according to the present invention for indicating the hyperlinks in a displayed Web page linked to previously bookmarked documents. With reference to FIG. 4, first, process step 81, a conventional Web browser program is provided at the Web page receiving display station, e.g. the computer controlled display of FIG. 1 or display station 56, 57 of FIG. 2. The browser has the conventional capability of having search engines perform Web database or resource searching. The browser is provided with the capability of presenting to the user a sequence of displayed hypertext Web pages, each having hyperlinks to other Web pages, step 82. In addition, the browser is provided with the capability of enabling the user to click on hyperlinks to access the linked Web pages, step 83. The browser is also provided with capability of enabling the user to bookmark any received and displayed Web page to thereby store the URL of the bookmarked page, step 84. The browser is provided with an implementation to maintain a list of the URLs of all bookmarked pages, step 85. Further, the browser is provided with an implementation to compare the URL of each hyperlink in a received and displayed Web page to the list of URLs of all bookmarked Web pages, step 86. Finally, the browser is provided with an implementation to display a visual indicator proximate each hyperlink to an already bookmarked Web page in a displayed Web page, step 87.

The running of the process will now be described with respect to FIG. 5. First, step 90, when there is a received Web document, the browser program loads the document into the receiving computer display. Then a determination is made as to whether the user has pressed the standard bookmark button, decision step 91. If Yes, then, step 92, a bookmark is added and the linkage to the bookmarked document is stored in the URL list, step 93. Then, or if the decision in step 91 is No, the process moves to step 94 wherein the list of stored URLs is compared to the URLs of the hyperlinks in the displayed Web page, step 94. Next, step 95, a determination is made as to whether any hyperlink URLs are on the list of already bookmarked URLs. If Yes, then a visual indicator is placed next to each hyperlink with an already bookmarked URL, step 96. Then, or if the decision from step 95 had been No, a determination is made as to whether the user has finished with the present Web page, step 97. If No, the user continues with his review of the present Web page. If Yes, then a further determination is made as to whether this is the last page, step 98. If Yes, the session is exited. If No, the session is branched back to step 90 where the browser accesses and displays the next Web page.

One of the preferred implementations of the present invention is as a routine in an operating system made up of programming steps or instructions resident in RAM 14, FIG. 1, during computer operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Internet, when required by the user of the present invention. One skilled in the art should appreciate that the processes controlling the present invention are capable of being distributed in the form of computer readable media in a variety of forms.

Although certain preferred embodiments have been shown and described, it will be understood that many changes and modifications may be made therein without departing from the scope and intent of the appended claims.

What is claimed is:

1. In a Web communication network with user access via a plurality of data processor controlled interactive receiving display stations for displaying received hypertext documents, transmitted from sources on the Web, including at least one display page containing text, images and a plurality of embedded hyperlinks, each hyperlink being user selectable to access and display a respective linked hypertext document, a method for tracking bookmarking in received Web documents comprising:

bookmarking, at one of said receiving display stations, selected received Web documents to thereby store, as bookmarks, direct links to the sources of said Web documents;

comparing said stored bookmarks to hyperlinks in each Web document received at said one display station to determine if said hyperlinks have been bookmarked; and visually distinguishing each bookmarked hyperlink in said received displayed Web document.

2. The Web communication method of claim 1 wherein said bookmarked hyperlinks are visually distinguished by displaying an indicator adjacent each bookmarked hyperlink.

3. The Web communication method of claim 1 wherein said bookmarked hyperlinks are visually distinguished by highlighting each bookmarked hyperlink.

4. The Web communication method of claim 3 wherein said step of highlighting said bookmarked hyperlinks by varying the brightness of each bookmarked hyperlink.

5. The Web communication method of claim 3 wherein said step of highlighting said bookmarked hyperlinks by varying the color of each bookmarked hyperlink.

6. The Web communication method of claim 1, further including a Web browser method at said one receiving display station, said Web browser method including said steps of:

bookmarking selected received Web documents to thereby store as bookmarks direct links to the sources of said Web documents;

comparing said stored bookmarks to hyperlinks in each Web document received at said one display station to determine if said hyperlinks have been bookmarked; and visually distinguishing each bookmarked hyperlink in said received displayed Web document.

7. The Web communication method of claim 6 wherein said bookmarked hyperlinks are visually distinguished by displaying an indicator adjacent each bookmarked hyperlink.

8. The Web communication method of claim 6 wherein said bookmarked hyperlinks are visually distinguished by highlighting each bookmarked hyperlink.

9. The Web communication method of claim 6 wherein said step of comparing includes:

maintaining a list of the URLs of all bookmarked Web documents; and comparing the URLs of the hyperlinks in a received Web document to said list of URLs.

10. In a Web communication network with user access via a plurality of data processor controlled interactive receiving display stations for displaying received hypertext documents, transmitted from sources on the Web, including at least one display page containing text, images and a plurality of embedded hyperlinks, each hyperlink being user selectable to access and display a respective linked hypertext document, a system for tracking bookmarking in received Web documents comprising:

apparatus associated with one of said receiving display stations for bookmarking of selected received Web documents to thereby store, as bookmarks, at said receiving display station, direct links to the sources of said Web documents;

apparatus associated with said one receiving display station for comparing said stored bookmarks to hyperlinks in each received Web document to determine if said hyperlinks have been bookmarked; and an implementation responsive to said apparatus for comparing, for visually distinguishing each bookmarked hyperlink in said received displayed Web document.

11. The Web communication network system of claim 10 wherein said apparatus for visually distinguishing said bookmarked hyperlinks includes an implementation for displaying an indicator adjacent each bookmarked hyperlink.

12. The Web communication network system of claim 10 wherein said apparatus for visually distinguishing said hyperlinks includes an implementation for highlighting each bookmarked hyperlink.

13. The Web communication network system of claim 10 wherein said apparatus for comparing include:

an implementation for maintaining a list of the URLs of all bookmarked Web documents; and.

apparatus for comparing the URLs of the hyperlinks in a received Web document to said list of URLs.

14. In a Web communication network with user access via a plurality of data processor controlled interactive receiving display stations for displaying received hypertext documents, transmitted from sources on the Web, including at least one display page containing text, images and a plurality of embedded hyperlinks, each hyperlink being user selectable to access and display a respective linked hypertext document, a system for tracking bookmarking in received Web documents, said system comprising:

a processor;

a computer memory holding computer program instructions which when executed by the processor perform the method comprising:

bookmarking, at one of said receiving display stations, selected received Web documents to thereby store, as bookmarks, direct links to the sources of said Web documents:

comparing said stored bookmarks to hyperlinks in each Web document received at said one display station to determine if said hyperlinks have been bookmarked; and visually distinguishing each bookmarked hyperlink in said received displayed Web document.

15. The Web communication system of claim 14 wherein said bookmarked hyperlinks are visually distinguished by displaying an indicator adjacent each bookmarked hyperlink.

16. The Web communication system of claim 14 wherein said bookmarked hyperlinks are visually distinguished by highlighting each bookmarked hyperlink.

17. The Web communication system of claim 16 wherein said bookmarked hyperlinks are highlighted by varying the brightness of each bookmarked hyperlink.

18. The Web communication system of claim 16 wherein said bookmarked hyperlinks are highlighted by varying the color of each bookmarked hyperlink.

19. The Web communication system of claim 14, wherein said performed method further includes a Web browser method at said one receiving display station, said Web browser method including:

bookmarking selected received Web documents to thereby store as bookmarks direct links to the sources of said Web documents;

comparing said stored bookmarks to hyperlinks in each Web document received at said one display station to determine if said hyperlinks have been bookmarked; and visually distinguishing each bookmarked hyperlink in said received displayed Web document.

20. The Web communication system of claim 19 wherein said bookmarked hyperlinks are visually distinguished by displaying an indicator adjacent each bookmarked hyperlink.

21. The Web communication system of claim 19 wherein said bookmarked hyperlinks are visually distinguished by highlighting each bookmarked hyperlink.

22. The Web communication system of claim 19 wherein said performed Web browser method comparing includes:

maintaining a list of the URLs of all bookmarked Web documents; and comparing the URLs of the hyperlinks in a received Web document to said list of URLs.

23. A computer useable medium having stored thereon a computer readable program for tracking bookmarking in received Web documents in a Web communication network with user access via a plurality of data processor controlled interactive receiving display stations for displaying received hypertext documents, transmitted from sources on the Web, including at least one display page containing text, images arid a plurality of embedded hyperlinks. each hyperlink being user selectable to access and display a respective linked hypertext document, wherein the computer readable program when executed on a computer causes the computer to:

bookmark, at one of said receiving display stations, selected received Web documents to thereby store, as bookmarks, direct links to the sources of said Web documents;

compare said stored bookmarks to hyperlinks in each Web document received at said one display station to determine if said hyperlinks have been bookmarked; and visually distinguish each bookmarked hyperlink in said received displayed Web document.

24. The computer usable medium of claim 23 wherein said computer program when executed distinguishes said bookmarked hyperlinks by displaying an indicator adjacent each bookmarked hyperlink.

25. The computer usable medium of claim 23 wherein said computer program when executed distinguishes said bookmarked hyperlinks by highlighting each bookmarked hyperlink.

26. The computer usable medium of claim 25 wherein said computer program when executed distinguishes said bookmarked hyperlinks by varying the brightness of each bookmarked hyperlink.

27. The computer usable medium of claim 25 wherein said computer program when executed distinguishes said bookmarked hyperlinks by varying the color of each bookmarked hyperlink.

28. The computer usable medium of claim 23, further including a Web browser program, which when executed on a computer causes said computer to:

bookmark selected received Web documents to thereby store as bookmarks direct links to the sources of said Web documents;

compare said stored bookmarks to hyperlinks in each Web document received at said one display station to determine if said hyperlinks have been bookmarked; and visually distinguish each bookmarked hyperlink in said received displayed Web document.

29. The computer usable medium of claim 28 wherein said Web browser program when executed distinguishes said bookmarked hyperlinks by displaying an indicator adjacent each bookmarked hyperlink.

30. The computer usable medium of claim 28 wherein said Web browser program when executed distinguishes said bookmarked hyperlinks by highlighting each bookmarked hyperlink.

31. The computer usable medium of claim 23 wherein said computer program when executed further causes the computer to:

maintain a list of the URLs of all bookmarked Web documents; and compare the URLs of the hyperlinks in a received Web document to said list of URLs.

\* \* \* \* \*